(12) United States Patent
Ikebukuro

(10) Patent No.: US 9,635,843 B2
(45) Date of Patent: May 2, 2017

(54) SPOOL BRAKING DEVICE AND FISHING REEL

(71) Applicant: Shimano Inc., Sakai, Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/015,471

(22) Filed: Feb. 4, 2016

(65) Prior Publication Data

US 2016/0235048 A1    Aug. 18, 2016

(30) Foreign Application Priority Data

Feb. 12, 2015   (JP) ................. 2015-025524

(51) Int. Cl.
*A01K 89/01*      (2006.01)
*A01K 89/0155*    (2006.01)
*A01K 89/033*     (2006.01)

(52) U.S. Cl.
CPC ...... *A01K 89/01555* (2013.01); *A01K 89/045* (2015.05)

(58) Field of Classification Search
CPC .......... A01K 89/0155; A01K 89/01555; A01K 89/01557
See application file for complete search history.

(56) References Cited

U.S. PATENT DOCUMENTS

| | | | | |
|---|---|---|---|---|
| 4,535,954 A | * | 8/1985 | Worth ............... | A01K 89/0155 242/286 |
| 4,544,111 A | * | 10/1985 | Nakajima ........ | A01K 89/01555 188/267 |
| 4,561,605 A | * | 12/1985 | Nakajima ........ | A01K 89/01555 188/267 |
| 4,585,183 A | * | 4/1986 | Puryear ............ | A01K 89/01555 242/288 |
| 4,618,106 A | * | 10/1986 | Noda ............... | A01K 89/01555 242/290 |
| 4,830,308 A | * | 5/1989 | Puryear ............ | A01K 89/01555 242/288 |
| 5,692,693 A | * | 12/1997 | Yamaguchi ...... | A01K 89/01555 242/288 |
| 5,749,534 A | * | 5/1998 | Morimoto ........ | A01K 89/01555 188/164 |
| 5,996,920 A | * | 12/1999 | Yamaguchi ...... | A01K 89/033 242/286 |

(Continued)

FOREIGN PATENT DOCUMENTS

JP           10-262518 A        10/1998

*Primary Examiner* — Emmanuel M Marcelo

(74) *Attorney, Agent, or Firm* — Global IP Counselors, LLP

(57) ABSTRACT

A spool braking device includes a conductor, a magnetic unit, and a support portion. The conductor has a rotational surface, and is configured to rotate in conjunction with a spool rotatably supported by a reel body. The magnetic unit has at least two magnets arranged on a surface facing the rotational surface of the conductor. The support portion movably supports the magnetic unit between a separated position that is separated from the rotational surface of the conductor and a proximal position that is proximate to the rotational surface of the conductor. The biasing member is configured to bias the magnetic unit from the proximal position to the separated position.

6 Claims, 8 Drawing Sheets

(56) References Cited

U.S. PATENT DOCUMENTS

| | | | | |
|---|---|---|---|---|
| 6,126,105 | A | * | 10/2000 | Yamaguchi ........ A01K 89/0155 188/164 |
| 2004/0182961 | A1 | * | 9/2004 | Moosberg ........ A01K 89/01555 242/288 |
| 2007/0108330 | A1 | * | 5/2007 | Ikuta ................ A01K 89/01555 242/288 |
| 2009/0026300 | A1 | * | 1/2009 | Tsutsumi ......... A01K 89/01555 242/288 |
| 2009/0127367 | A1 | * | 5/2009 | Tsutsumi ......... A01K 89/01555 242/286 |
| 2013/0306777 | A1 | * | 11/2013 | Ikebukuro ........ A01K 89/01555 242/288 |
| 2016/0037759 | A1 | * | 2/2016 | Ikebukuro ........ A01K 89/01555 242/288 |

* cited by examiner

SPOOL BRAKING DEVICE AND FISHING REEL

CROSS-REFERENCE TO RELATED APPLICATIONS

This application claims priority based on Japanese Patent Application No. 2015-025524, filed in the Japan Patent Office on Feb. 12, 2015, the contents of which is hereby incorporated herein by reference.

BACKGROUND

Field of the Invention

The present invention relates to a spool braking device for braking a spool which is rotatably supported by a reel body, and a fishing reel which includes the spool braking device.

Background Information

In a fishing reel, backlash can occur when a spool, to which fishing line is wound, is over rotated in the casting direction (i.e., unreeled), and the rotational speed of the spool is faster than the casting (i.e., line delivering) speed. When backlash occurs, so-called line slack occurs, in which the fishing line sags causing the fishing line to tangle. Thus, some fishing reels include a braking device, which applies a braking force to the rotating spool to prevent backlash. There are, in general, roughly two types of braking devices. One uses centrifugal force to act as a frictional force to a freely rotating spool, and the other acts using a magnetic force to the freely rotating spool.

A braking device that applies a braking force to a freely rotating spool by an acting magnetic force comprises, for example, as disclosed in Japanese Published Unexamined Application No. 1998-262518, a conductor, a magnet, a spool rotation controlling device and a control effect adjustment device or means. The conductor is disposed in one of either the spool or the reel body, and the magnet is disposed in the other of the spool or the reel body. The magnet applies braking force the rotation of the spool by the magnetic force on the conductor. The spool rotation controlling device controls (increases/decreases) the magnetic force acting on the conductor by the magnet in response to the rotation speed (increases/decreases) of the spool to control the rotation speed of the spool. The control effect adjustment device adjusts the magnitude of the control effect that the spool rotation speed controlling device produces by the rotation speed (increases/decreases) of the spool.

The fishing reel, as described in Japanese Published Unexamined Application No. 1998-262518, controls the rotation speed of the spool by relatively moving one of the conductor and the magnet with respect to the other according to the rotation speed (increases/decreases) of the spool, thereby controlling (increases/decreases) the magnetic force that the magnet acts on the conductor according to the rotation speed of the spool. Consequently, it is possible to maintain a low magnetic force that acts on the conductor, and reduce the braking force with respect to the spool, until the rotation speed of the spool becomes relatively high in the initial stage immediately after the beginning of casting, and eliminate unnecessary load of the braking force with respect to the spool. As a result, it is possible to improve the flight distance of the tackle, while increasing the release speed of the fishing line from the spool.

Japanese Published Unexamined Application No. 2013-236606 discloses a spool braking device comprising a conductor that rotates in conjunction with a spool, a magnet that is movable in the axial direction with respect to the reel body and that is opposable with the conductor in the radial direction, and a braking force adjustment device or means for braking the rotation of the spool. The braking force adjustment device changes the range of opposition at which the conductor and the magnet are opposed in the radial direction and varies the number of magnetic flux of the magnet that acts on the conductor according to changes in the opposing range, by moving the magnet in the axial direction with respect to the reel body, based on the magnetic force of the magnet that acts on the conductor, when the conductor is rotated in a state in which the magnet and the conductor are opposed in the radial direction. The spool braking device of Japanese Published Unexamined Application No. 2013-236606 is configured to be able to adjust the braking force in a wide range, and to appropriately apply a braking force corresponding to the rotation of the spool to the spool.

SUMMARY

In the embodiments of the inventions as described herein, a spool rotation speed controlling device (a braking force adjustment device) adjusts the magnitude of the braking force by the magnetic force, by moving either the conductor or the magnet in the rotational axis direction of the spool, in response to the rotation speed (increase/decrease) of the spool. With this type of braking force adjustment device, a certain amount of weight is needed to obtain the centrifugal force necessary to move the conductor or the magnet, and, further, space for the movement is needed. For this reason, this type of braking force adjustment device has inhibited a reduction in weight and size, and, therefore, a inhibited the reduction in the weight and the size of the reel itself.

The present invention was devised to solve these problems, and an object thereof is to achieve a reduction in weight and size of a spool braking device used for a fishing reel.

The spool braking device according to a first aspect of the present invention comprises a conductor, a magnetic unit, a support portion, and a biasing unit. The conductor rotates in conjunction with a spool that is rotatably supported by a reel body. The magnetic unit has at least two magnets arranged on a surface that oppose the rotational surface of the conductor. The support portion supports the magnetic unit so as to be movable between a separated position that is separated from the rotational surface of the conductor and a proximal position that is proximate to the rotational surface of the conductor. The biasing unit biases the magnetic unit from the proximal position to the separated position.

Preferably, the magnetic unit comprises an N-pole and an S-pole which are alternately arranged on a surface that opposes the rotational surface of the conductor in the rotational circumferential direction of the conductor.

Preferably, the support portion comprises a pivot support shaft which pivotably supports first end of the magnetic unit.

Preferably, the biasing unit comprises a pivot biasing portion that biases the second end of the magnetic unit in the pivoting direction.

A fishing reel according to a second aspect of the present invention comprises a reel body attached to a fishing rod, a spool that is rotatably supported by the reel body and winds the fishing line on the periphery thereof, and the spool braking device according to the first aspect of the present invention.

According to the present invention, the change rate of the flux in the rotational circumferential direction at a prescribed rotational surface having a prescribed unit width in the rotational axis direction of the conductor is varied by the rotation of the conductor. As a result, one of the conductor and the magnet does not need to be moved in the rotational axis direction, and it is possible to reduce the weight and the size of the spool braking device.

BRIEF DESCRIPTION OF THE DRAWINGS

Referring now to the attached drawings which form a part of this original disclosure.

DETAILED DESCRIPTION OF THE EMBODIMENTS

Figure 1:
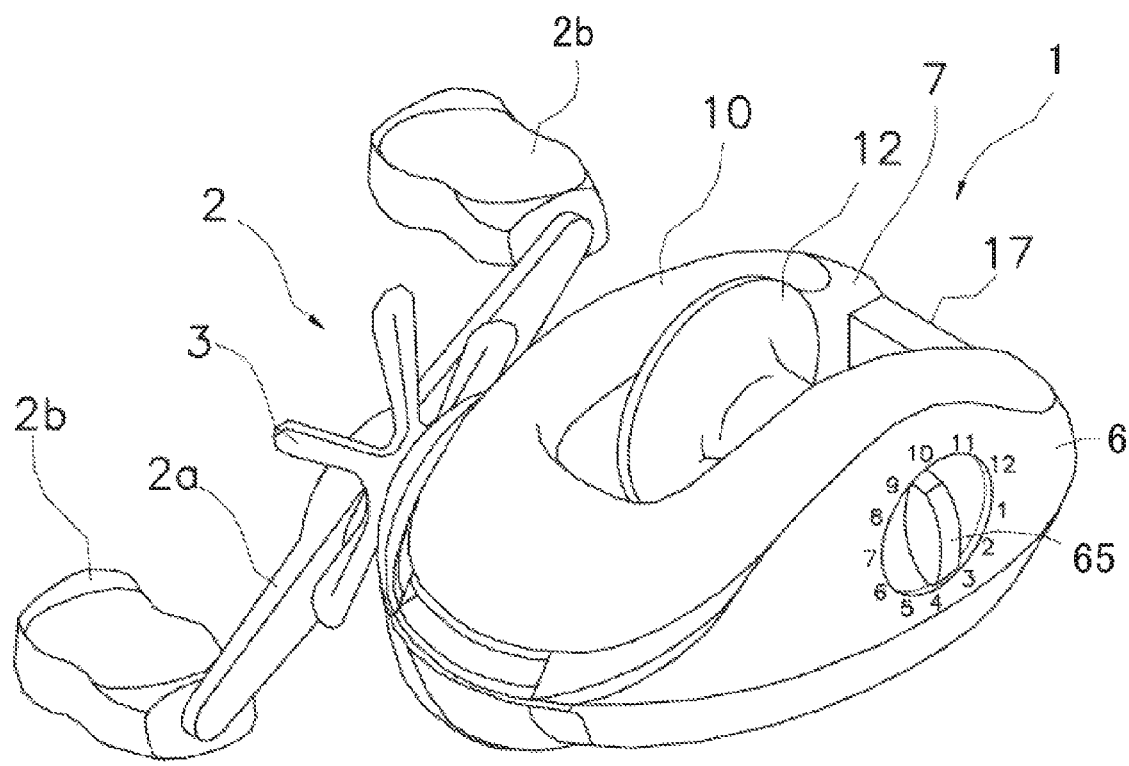
FIG. 1 is a perspective view of a fishing according to an embodiment of the present invention.

FIG. 1 is a perspective view of a fishing reel according to an embodiment of the present invention. This fishing reel is a dual bearing reel that is used mainly for lure fishing. This dual bearing reel comprises a reel body 1, a handle 2 disposed on the side of the reel body 1, and a star drag 3 for drag adjustment, the star drag being disposed on the reel body 1 side of the handle 2. A spool 12 to which a fishing line is wound is rotatably supported by reel body 1. The spool 12 is disposed between a first side cover 6 and a second side cover 7. It is possible to wind the fishing line by turning the handle 2 to rotate the spool 12. The handle 2 comprises a plate-shaped arm portion 2a, and a pair of grips 2b that are rotatably mounted to both ends of the arm portion 2a.

The fishing reel is attached to a fishing rod so that the left front side in FIG. 1 is oriented toward the distal end (front) of the fishing rod. The fishing line is normally stretched from the spool 12 towards the left front side in FIG. 1. The left front side in FIG. 1 is referred to as the front of the reel body 1, and the right rear side is referred to as the rear. A clutch operation lever 17 is disposed on the rear of the reel body 1. The clutch between the handle 2 and the spool 12 can be cut by operating the clutch operation lever 17. A thumb rest 10 is mounted so as to surround the front side of the spool 12.

When the fishing line wound around the spool 12 is unreeled by a casting operation, the spool 12 is rotated. To prevent backlash during the casting operation, a spool braking device is disposed inside the reel body 1. An operation knob 65 for adjusting the braking force of the spool braking device is disposed on a first side cover 6 on the opposite side of the handle 2 of the reel body 1. By turning the operating knob 65, it is possible to adjust the braking force of the spool 12.

Figure 2:
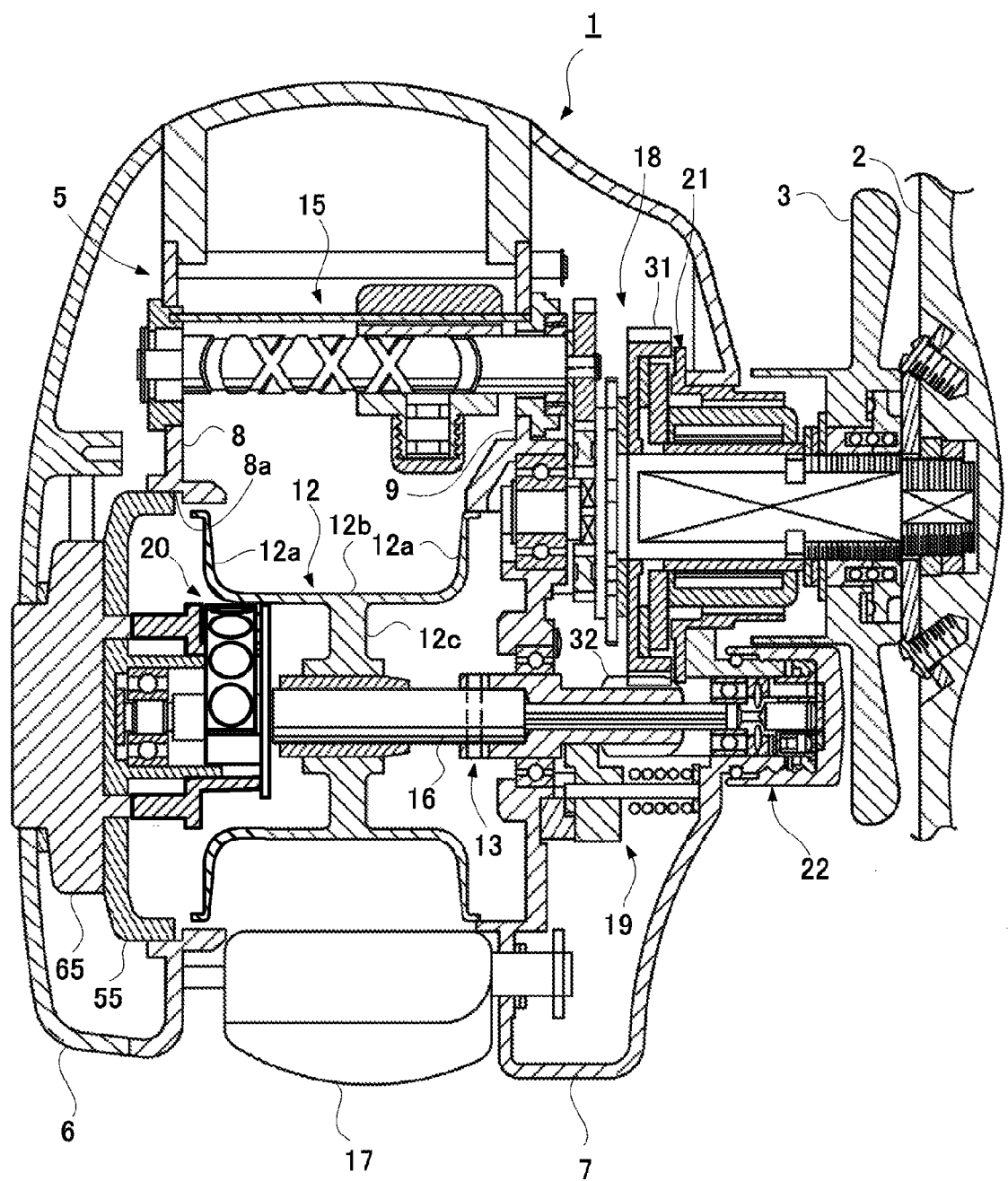
FIG. 2 is a cross-sectional view of a fishing reel according to the embodiment.

FIG. 2 is a cross-sectional view of a fishing reel according to the embodiment. Viewing FIG. 2 in the direction in which the characters are upright, up is the front and down is the rear of the reel body 1. In FIG. 2, the portions of the braking device are not in the cross section. The reel body 1 comprises a frame 5, and a first side cover 6 and a second side cover 7 mounted on the two sides of the frame 5. The frame 5 comprises a pair of side plates (i.e., a first side plate 8 and a second side plate 9) arranged facing each other at a prescribed distance, and a plurality of connecting portions, which are not shown, that couple the first side plate 8 and the second side plate 9.

The second side cover 7 on the handle 2 side is detachably fixed to the second side plate 9 by a screw. An opening 8a through which the spool 12 can pass is formed on the first side plate 8, which is on the other side of the handle 2. A brake case 55 is fitted to the first side cover 6, which is on the other side of handle 2.

A spool 12, a level winding mechanism 15, and a clutch operation lever 17 are arranged inside the frame 5. The level winding mechanism 15 is a mechanism for evenly winding the fishing line to the spool 12. The clutch operation lever 17 is positioned where the thumb is placed when conducting thumbing.

A gear mechanism 18, a clutch mechanism 13, a clutch engagement and disengagement mechanism 19, a drag mechanism 21, and a casting control mechanism 22 are arranged between the second side plate 9 and the second side cover 7 of the frame 5. The gear mechanism 18 transmits the torque from the handle 2 to the spool 12 and the level winding mechanism 15. The clutch engagement and disengagement mechanism 19 engage and disengage the clutch mechanism 13 in response to an operation of the clutch operation lever 17. The drag mechanism 21 brakes the spool 12 during casting. The casting control mechanism 22 performs braking by sandwiching both ends of a spool shaft 16. Further, a spool braking device 20 for suppressing backlash of the spool 12 during casting is disposed in the opening 8a.

The spool 12 is, for example, made of aluminum alloy, and is a nonmagnetic electrical conductor. The spool 12 may be regarded as a conductor that is rotated in conjunction with the spool 12. The spool 12 comprises a dish-shaped flange 12a on both sides that are continuous with a tubular line winding cylinder part 12b at both ends thereof. The spool 12 comprises a tubular boss portion 12c that is integrally formed on both inner perimeter sides of the line winding cylinder part 12b. The spool 12 is fixed to a spool shaft 16 that extends through the boss portion 12c such that the spool and the spool shaft cannot rotate relative to each other, for example, by serration bonding.

The spool shaft 16 extends through the second side plate 9 and extends outward from the second side cover 7. The end of the spool shaft 16 close to the handle 2 is rotatably supported with respect to the second side cover 7. The end of the spool shaft 16 that is close to the first side cover 6 is rotatably supported by the brake case 55.

When the handle 2 is turned, rotation thereof is transmitted to the spool shaft 16 via a drive gear 31, the pinion gear 32, and the clutch mechanism 13. The clutch mechanism 13 can be disengaged by operating the clutch operation lever 17. The clutch mechanism 13 is configured to be automatically connected the handle 2 is rotated in the line winding direction. If the clutch mechanism 13 is disengaged, the spool shaft 16 and the spool 12 can be rotated independently of the handle 2. When casting with the clutch mechanism 13 disengaged, the spool 12 freely rotates and the fishing line is unreeled. At this time, to prevent backlash, the spool braking device 20 is actuated to brake the rotation of the spool 12. The spool braking device 20 comprises a magnet, and brakes the rotation of the spool 12 by an induction force that is caused in the spool 12 by the magnet.

Figure 3:
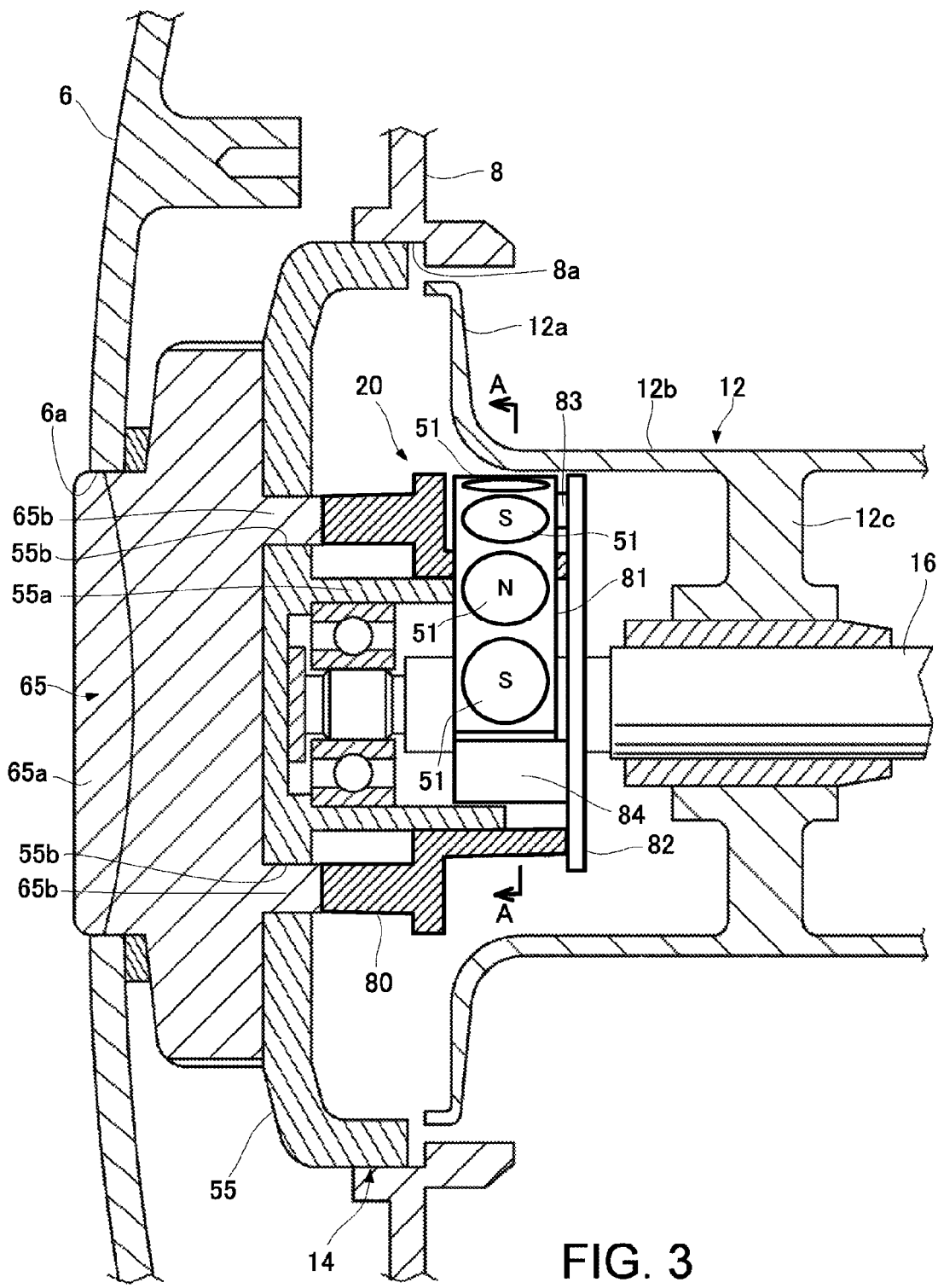
FIG. 3 is a cross-sectional view of a spool braking device according to the embodiment.

FIG. 3 is a cross-sectional view of the spool braking device according to the embodiment. In FIG. 3, the magnetic unit and the support plate 82 are not in the cross section. The brake case 55 is a bottomed cylindrical member. The outer perimeter part of the brake case 55 is mounted to an opening 8a of the first side plate 8 by a bayonet structure 14. An inner cylinder portion 55a that protrudes in a tubular shape is formed in the center portion on the spool 12 side of the brake case 55. A tubular portion 80 of the spool braking device 20 is mounted on the outer perimeter part of the inner cylinder portion 55a. The inner perimeter part of the inner cylinder portion 55a supports the spool shaft 16 via an axle bearing. A plurality of through-holes 55b are formed on the outer perimeter part of the proximal end portion of the inner cylinder portion 55a. A pressing portion 65b of an operating knob 65 is inserted in the through-hole 55b.

The operating knob 65 comprises a circular knob portion 65a and a plurality of pressing portions 65b. The knob portion 65a is a portion that is exposed from an opening 6a that is formed in the first side cover 6. The plurality of pressing portions 65b protrude from the spool 12 side of the knob portion 65a. The pressing portion 65b is inserted in the through-hole 55b, and abuts the bottom surface of the tubular portion 80 so as to be capable of pressing the tubular portion 80 of the spool braking device 20. The configuration of the spool braking device 20 is described below.

The spool braking device 20 comprises a tubular portion 80, four magnets 51, a retaining member 81, and a support plate 82. The tubular portion 80 is disposed so that the center axis thereof matches the center axis of the spool shaft 16. The four magnets 51 are arranged on a cylindrical surface which opposes the inner periphery of the spool 12, and are integrally held by the retaining member 81. The relative positions and orientations of the magnets 51 do not change. The magnets 51 and the retaining member 81 form the magnetic unit. The surfaces of the magnets 51 which oppose the rotational surface of the spool 12 are arranged in the order of S-pole, N-pole, S-pole, and N-pole, from the side that is distant from the pivot shaft 83. The N-pole and the S-pole of the magnets 51 are arranged in the rotational circumferential direction of the spool 12. The arrangement of the N-pole and the S-pole of the magnets 51 may be started from with either pole as long as the poles are alternately arranged.

The support plate 82 is supported by the tubular portion 80. The retaining member 81 is supported by the support plate 82 so as to be pivotable about the pivot shaft 83 at the end thereof. The center axis of the pivot shaft 83 is parallel to the spool shaft 16. That is, the magnetic unit is pivotably supported about the pivot shaft 83, which is parallel to the spool shaft 16 and separated from the center of the spool 12 at the end thereof. Therefore, the magnets 51 can have a separated position that is separated from the inner perimeter surface (rotational surface) of the spool 12, or a proximal position that is proximate to the inner perimeter surface (rotational surface) of the spool 12. A spring retainer 84 is disposed on the support plate 82. The end of the retaining member 81 on the opposite side of the pivot shaft 83 is biased in a direction from the inner perimeter surface (rotational surface) of the spool 12 toward the tubular portion 80, that is, from the proximal position toward the separated position, by a spring 85 which is not shown in FIG. 3.

Figure 4:
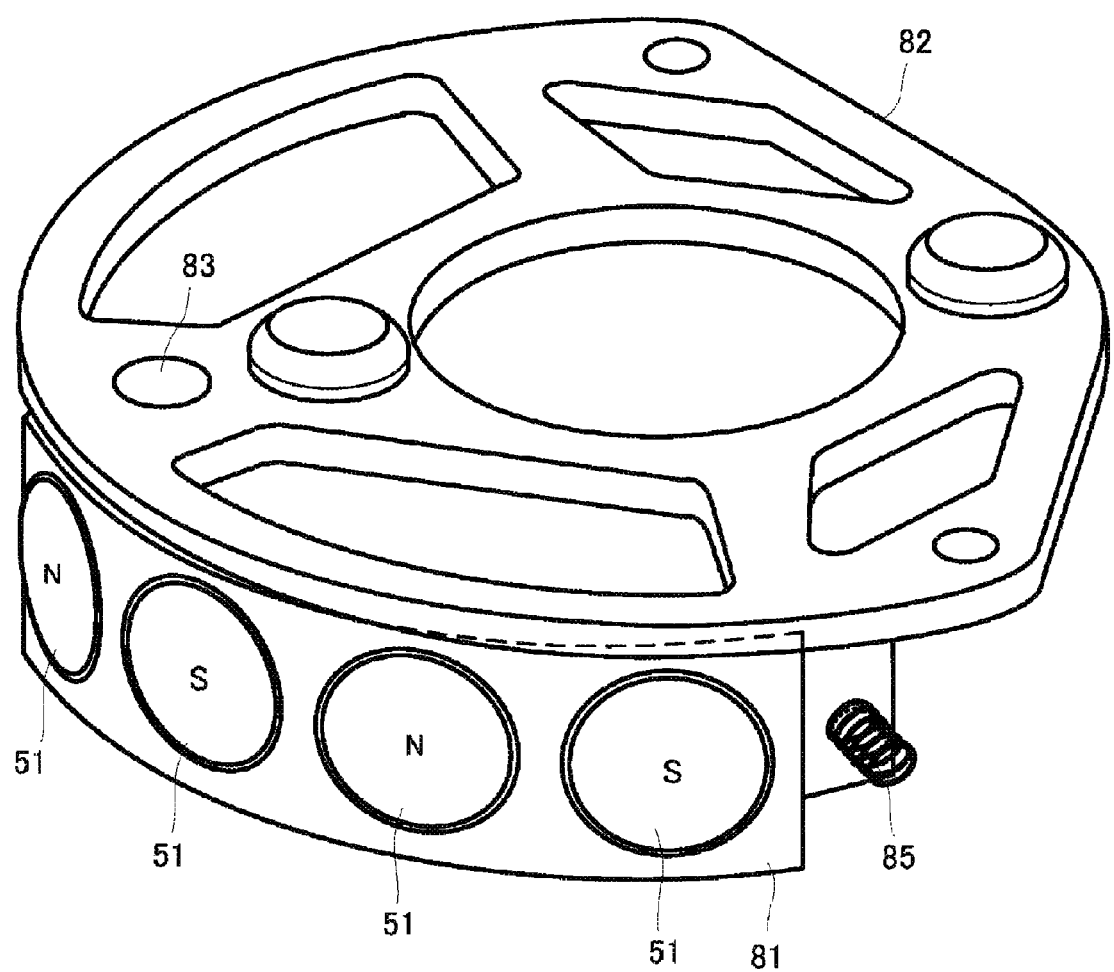
FIG. 4 is a perspective view of a magnetic unit according to the embodiment.

FIG. 4 is a perspective view of the magnetic unit according to the embodiment. In FIG. 4, the spring retainer 84 is omitted, and the spring 85 is visible. The spring 85 is held by the outside surface of a protrusion that is formed at the end of the retaining member 81. FIG. 4 shows a state in which the magnetic unit is in the separated position. It is shown that the magnet 51 that is close to the spring 85 is in a position farther from the spool 12 than the magnet 51 that is close to the pivot shaft 83.

Figure 5:
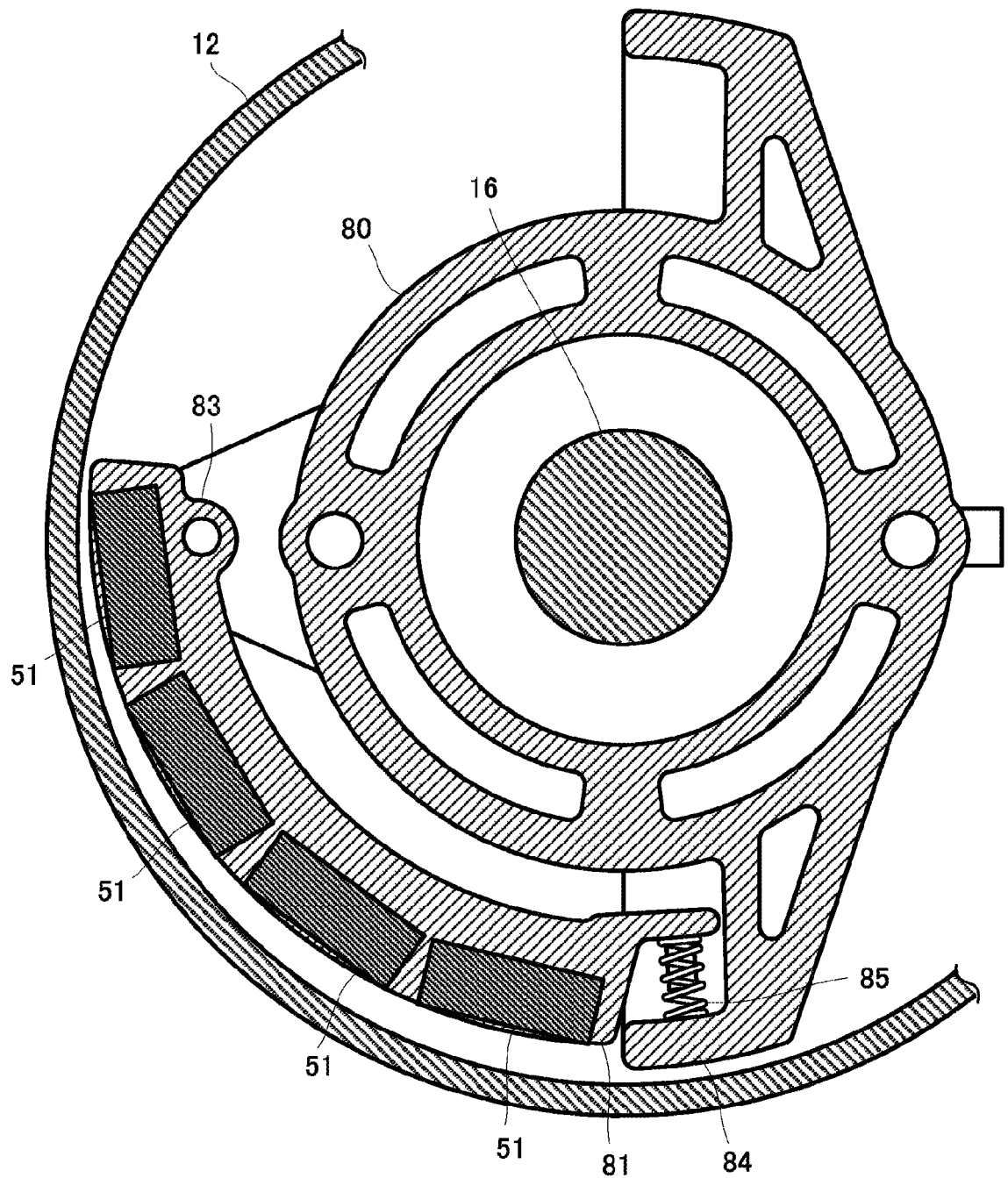
FIG. 5 is a cross-sectional view showing a separated state of the magnetic unit according to the embodiment.

FIG. 5 is a cross-sectional view showing a separated state of the magnetic unit according to the embodiment. FIG. 5 is a view along the A-A line cross-section in FIG. 3. The four magnets 51 that form the magnetic unit are arranged on a surface which opposes the inner perimeter surface (rotational surface) of the spool 12, and are integrally held by the retaining member 81. The retaining member 81 is supported so as to be pivotable about the pivot shaft 83 at the end thereof. A spring retainer 84 is formed in the tubular portion 80 extending from the outer perimeter surface thereof toward the spool 12. A spring 85, which is a coil spring, is disposed between the spool shaft 16 side surface of the spring retainer 84, and the end (the second end) of the retaining member 81 that is on the opposite side of the supported end (the first end). The second end of the retaining member 81 is biased by the spring 85 in a direction away from the inner perimeter surface of the spool 12, from the proximal position to the separated position. FIG. 5 shows a state in which the spring 85 is stretched and the magnetic unit is in the separated position. When the spool 12 is in a state of not being rotated with respect to the magnetic unit, induction force by the magnets 51 is not generated in the spool 12. Since the reaction force of the induction force does not act on the magnets 51, the magnetic unit is pushed to the separated position by the biasing force of the spring 85.

Figure 6:
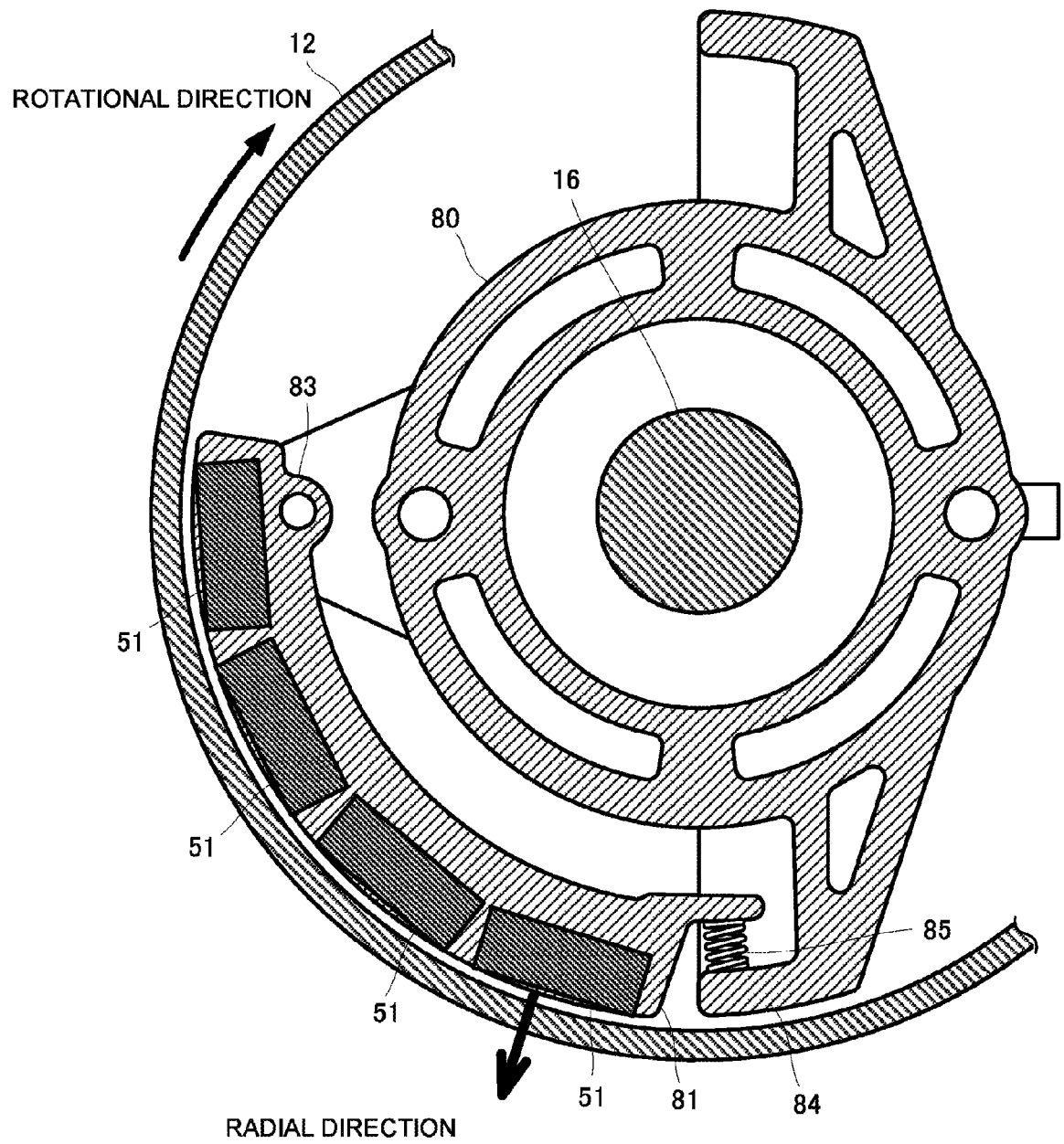
FIG. 6 is a cross-sectional view showing a proximate state of the magnetic unit according to the embodiment.

FIG. 6 is a cross-sectional view showing a proximate state of the magnetic unit according to the embodiment. FIG. 6 is a view along the A-A line cross-section in FIG. 3. When the spool 12 is rotated in the clockwise (rotational) direction in FIG. 6 by a casting operation, an eddy current corresponding to the rotation speed is generated in the spool 12 due to the flux of the magnets 51 that oppose the rotational surface of the spool 12. An induction force in a direction opposite to the rotational direction is applied to the spool 12 due to this eddy current. The spool 12 is thereby braked. With the reaction force of the induction force caused by the magnets 51 by the rotation of the spool 12 (movement of the spool surface), the magnets 51 are dragged the radial direction of the spool 12. As a result, the magnetic unit 85 is attracted to the rotational surface of the spool 12 against the biasing force of the spring 85, with the pivot shaft 83 as the fulcrum. FIG. 6 shows a state in which the spring 85 is compressed and the magnetic unit is in the proximal position. In the proximal position, the protrusion of the retaining member 81 that holds the spring 85 on the outer side surface thereof abuts the spring retainer 84, or, the inter-wires of the spring 85 come into close contact; therefore the magnetic unit does not come any closer to the spool 12. The magnets 51 and the retaining member 81 do not come in contact with the spool 12.

As the magnetic unit approaches the proximal position, the flux which interlinks across the spool 12 (conductor) is increased. Therefore, the change rate of the flux of the spool 12 in the rotational circumferential direction is increased. In particular, since the polarities of the magnetic poles of adjacent magnets 51 are different, the change rate of the flux in the rotational circumferential direction is increased. Therefore, the induction force, i.e., the braking force is increased as the magnetic unit approaches the rotational surface of the spool 12.

Figure 7:
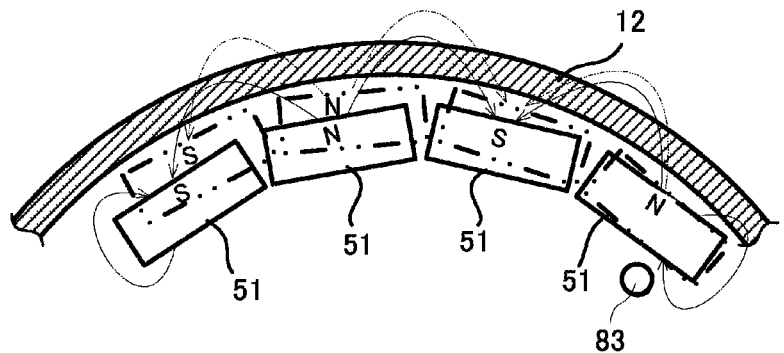
FIG. 7 is a conceptual diagram showing the action of the spool braking device according to the embodiment.

FIG. 7 is a conceptual diagram showing the action of the spool braking device according to the embodiment. In FIG. 7, only the spool 12, the magnets 51, and the pivot shaft 83 are shown in order to facilitate understanding. In FIG. 7, the magnets 51 when in the separated position, are represented by the solid lines and the magnets 51 when in the proximal position are represented by the chain double-dashed lines. Similarly, the magnetic lines when in the separated position are represented by the solid lines and the magnetic lines when in the proximal position are represented by the chain double-dashed lines.

As shown in FIG. 7, a magnetic line that comes out of the N-pole of a magnet 51 enters the S-pole of the adjacent magnet 51. Since there is an S-pole on the opposite side of the N-pole and an N-pole is on the opposite side of the S-pole of a magnet 51, a magnetic line, while omitted in FIG. 7, is generated on the opposite side of the spool 12 as well. In the magnet 51, at the end of the magnetic unit, a manner is depicted in which a magnetic line extends from the surface on the opposite side of the spool 12 to the surface on the spool 12 side.

When the magnetic unit is in the separated position, the magnetic lines that interlink across the spool 12 are less (magnetic flux density is smaller) in the magnets that are at a greater distance from the pivot shaft 83. When in the proximal position, the distances between the magnets 51 and the rotational surface of the spool 12 is substantially equal, approaching the spool 12 as a whole. As the magnetic unit moves from the separated position to the proximal position, changes in the magnetic flux that interlink across the spool 12 are particularly greater in magnets 51 that are farther from the pivot shaft 83, and the flux that interlink across the spool 12 increases as a whole, increasing the change rate of the flux in the rotational circumferential direction.

Figure 8A:
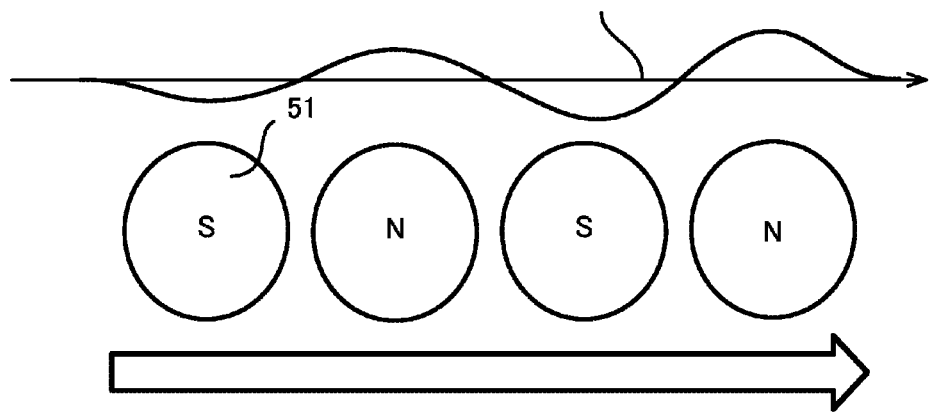
FIG. 8A is a conceptual diagram showing the flux of the spool braking device in the separated position according to the embodiment.

FIG. 8A is a conceptual diagram showing the flux when the spool braking device according to the embodiment is in the separated position. The white arrow in FIG. 8A shows the direction in which the spool 12 is rotated. The magnets 51 of the magnetic unit are arranged, from the left, in the order of S-pole, N-pole, S-pole, and N-pole, with respect to the surface that opposes the spool 12. The magnet 51 on the right side is closer to the pivot shaft 83, and the magnets 51 are farther away from the pivot shaft 83 heading to the left side. The strength of the flux that interlinks across the rotational surface of the spool 12 is shown by the curves on both sides of a magnetic flux reference line showing the rotational circumferential direction. The upper side of the magnetic flux reference line represents the flux that enters the rotational surface (N-pole side), and the lower side represents the flux that exits the rotational surface (S-pole side). When in the separated position, the magnets on the left side are farther from the spool 12; therefore, the difference between the magnetic flux strength and the magnetic flux reference line (absolute value) is smaller heading toward the left in the drawing.

Figure 8B:
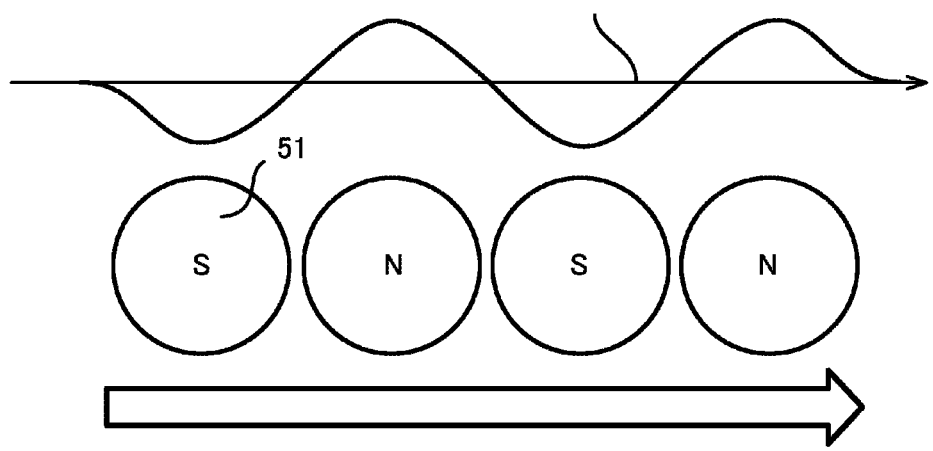
FIG. 8B is a conceptual diagram showing the flux of the spool braking device in the proximal position according to the embodiment.

FIG. 8B is a conceptual diagram showing the flux when the spool braking device according to the embodiment is in the proximal position. The white arrow and the magnetic flux reference line are the same as in FIG. 8A. When in the proximal position, all of the magnets 51 in the magnetic unit are equally close to the rotational surface of the spool 12. Therefore, the difference between the magnetic flux strength and the magnetic flux reference line (absolute value) is the same for both left and right, being large as a whole. Thus, the (absolute value of the) change rate of the flux in the rotational circumferential direction is greater compared to when in the separated position (FIG. 8A). Since induction force is proportional to the change rate of the flux, if the change rate of the flux in the rotational circumferential direction is increased, the induction force, that is, the braking force is increased.

In the embodiment, the four magnets 51 are integrally held by the retaining member 81, and are integrally moved as a magnetic unit. Therefore, the braking force will not fluctuate as long as the biasing force of the spring 85 and the resistance of the pivot shaft 83, etc., do not change. For example, in a structure in which four magnets 51 are movably supported independently, and are separately biased to the separated position, there is the possibility that the braking force will vary. In the embodiment, the magnets 51 are integrally moved; therefore, a braking force can be obtained in which the reproducibility of the braking force is highly stable.

When the magnetic unit is in the position shown in FIG. 3, about half of each of the magnets 51 on the boss portion 12c side of the spool 12 opposes the line winding cylinder part 12b, while the half on the operating knob 65 side overlaps with the curved portion to the flange 12a. A braking force is not generated by the entire magnetic flux on the rotational surface side of the magnets 51. The braking force can be adjusted by moving the magnetic unit in the axial direction of the spool 12 to increase or decrease the surface of the magnet 51 that opposes the line winding cylinder part 12b. The fishing reel according to the embodiment is configured so that the magnetic unit can be moved in the axial direction of the spool 12 by turning the operating knob 65.

The knob portion 65a in FIG. 3 is rotatably supported in the opening 6a. The operating knob 65 comprises a cam mechanism, which is not shown, that converts the rotation of the knob portion 65a to a movement of the pressing portion 65b in the axial direction. For example, when the operating knob 65 is turned in the clockwise direction, the tubular portion 80 is moved in the direction approaching the boss portion 12c of the spool 12 (right side in FIG. 3) due to the cam action. That is, the magnetic unit approaches the boss portion 12c. As a result, the amount of flux that passes through the spool 12 is increased, and the braking force with respect to the spool 12 is increased.

If the operating knob 65 is rotated in the counterclockwise direction, the tubular portion 80 and the magnetic unit is moved in a direction away from the boss portion 12c (left side in FIG. 3) due to the cam action. That is, the magnets 51 are separated from the line winding cylinder part 12b of the spool 12. As a result, the amount of flux that passes through the spool 12 is decreased, and the overall braking force is decreased. The braking force of the spool 12 is set by rotating the operating knob 65 in this manner.

Further, the initial braking force can be increased by bringing the retaining member 81 closer to the rotational surface of the spool 12, that is, by bringing the separated position closer to the rotational surface, in a state in which the spool 12 is stopped. In other words, it is possible to change the ratio between the maximum braking force when the spool 12 rotating and the minimum braking force when rotation is being started.

According to the spool braking device 20 of the embodiment, two or more magnets 51 that are arranged opposing the rotational surface of the conductor (spool 12) are integrally held as a magnetic unit, and the magnetic unit is moved from the separated position to the proximal position in a direction perpendicular to the rotational surface by the rotation of the conductor. Accordingly, it is not necessary to move one of the conductor or the magnets 51 in the rotational axis direction, and it is possible to achieve a reduction in weight and size of the spool braking device 20. Furthermore, since a plurality of magnets 51 is integrally moved, a braking force can be obtained in which the reproducibility of the braking force is highly stable.

Modified Example

Figure 9:
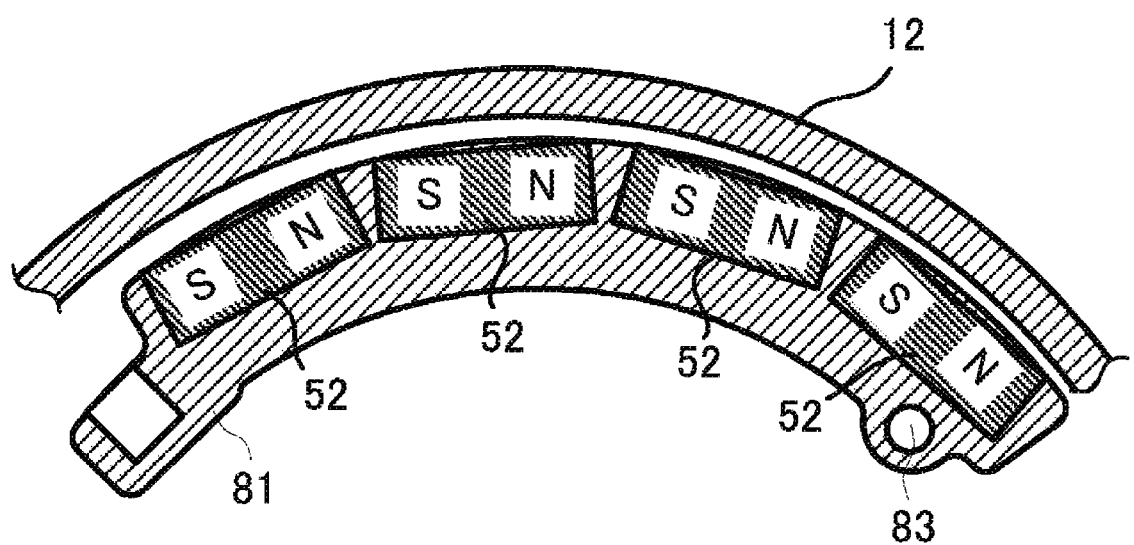
FIG. 9 is a cross-sectional view showing a modified example of the magnetic unit according to the embodiment.

FIG. 9 is a cross-sectional view showing a modified example of the magnetic unit according to the embodiment. In the magnetic unit of the embodiment shown in FIG. 3 and FIG. 4, the magnetic poles of the magnets 51 are configured so that an S-pole (or an N-pole) is formed on a surface toward the rotational surface of the spool 12, and an N-pole (or an S-pole) is formed on the surface on the opposite side of the rotational surface of the spool 12. In the modified example shown in FIG. 9, the S-pole and the N-pole of each of the magnets are formed on the surface toward the rotational surface of the spool 12. In this embodiment as well, S-poles and N-poles are alternately arranged in the rotational circumferential direction of the spool 12.

If the size of the magnets 52 of the modified example is assumed to be the same size as the magnets 51 in FIG. 5, etc., the period of change of the magnetic poles in the rotational circumferential direction in FIG. 9 will be about half that of FIG. 5. If the strength of the magnetic field is the same, the change rate of the flux in the rotational circumferential direction in FIG. 9 will be larger than that in FIG. 5.

In the embodiment, a case in which the spool 12 is a conductor was described as an example. If there is a conductor that is linked with the spool 12, it is not necessary for the spool 12 to be a conductor. For example, a configuration can be employed in which a cylindrical conductor is bonded to the inner perimeter surface of the spool 12 that is formed from a nonconductive material. In this embodiment, the spool braking device 20 is disposed so as to oppose the magnets 51 to the conductor that is linked to the spool 12.

Further, in the embodiment, a configuration was described in which the conductor is cylindrical. The spool braking device 20 can be applied as long as the conductor is rotated in conjunction with the spool 12. For example, the configuration of the embodiment can be applied with modification, to a case in which the conductor is a disc. The disc is, for example, a flange 12a of the spool 12. In this embodiment, the rotational surface is a disc surface. The magnets 51 are arranged in a fan shape opposing the disc surface to form the magnetic unit. The magnetic unit is pivotably supported about a shaft that is, for example, perpendicular to the rotational shaft of the spool 12 at the end thereof. Then, for example, the second end of the magnetic unit may be biased in a direction separating from the disc surface.

In the embodiment, the magnets 51 or the magnets 52 are arranged in a single row in the rotational circumferential direction. The arrangement of the magnets 51 or the magnets 52 is not limited to a single row in the rotational circumferential direction. For example, the arrangement may be in two or more rows in the rotational circumferential direction. In this case as well, the magnetic unit is preferably configured to comprise an N-pole and an S-pole which are alternately arranged on a surface that opposes the rotational surface of the conductor in the rotational circumferential direction of the conductor. If arranged in two or more rows in the rotational circumferential direction, the resolution of the braking force with respect to an operation of the operating knob 65 can be reduced.

Further, the magnets 51 or the magnets 52 may be arranged in a single row in the rotational axis direction of the spool 12. In this embodiment, it is preferable to use magnets 52 having an N-pole and S-pole on the surface that opposes the rotational surface, so that the N-pole and the S-pole are arranged in the rotational circumferential direction.

Meanwhile, it is not necessary for the pivot shaft 83 to be parallel to the rotational axis of the spool 12. For example, the end of the magnetic unit on the boss portion 12c side or the operating knob 65 side may be pivotably supported around an axis that is perpendicular to the rotational axis of the spool 12. For example, when arranging magnets 52 in a single row in the rotational axis direction of the spool 12, the end in the arrangement direction can be pivotably supported around an axis that is perpendicular to the rotational axis of the spool 12.

In the embodiment, a compression coil spring was used as the spring 85 that biases the magnetic unit from the proximal position to the separated position. The member for biasing the magnetic unit is not limited to a compression coil spring. For example, the end of the retaining member 81 may be biased to the tubular portion 80 side by a tension coil spring. Further, a torsion coil spring or a plate spring may be disposed between the end of the retaining member 81 and the spring retainer 84.

What is claimed is:

1. A spool braking device, comprising:
    a conductor having a rotational surface facing in a radial direction, the conductor configured to rotate in conjunction with a spool rotatably supported by a reel body;
    a magnetic unit having at least two magnets arranged on a surface facing the rotational surface of the conductor;
    a support portion movably supporting the magnetic unit between a separated position that is separated from the rotational surface of the conductor and a proximal position that is proximate to the rotational surface of the conductor; and
    a biasing member configured to bias the magnetic unit from the proximal position to the separated position.

2. The spool braking device recited in claim 1, wherein the magnetic unit comprises an N-pole and an S-pole which are alternately arranged on the surface facing the rotational surface of the conductor in the rotational circumferential direction of the conductor.

3. The spool braking device recited in claim 1, wherein the support portion comprises a pivot support shaft pivotably supporting a first end of the magnetic unit.

4. The spool braking device recited in claim 3, wherein the biasing unit comprises a pivot biasing portion configured to bias a second end of the magnetic unit in a pivoting direction.

5. A fishing reel, comprising:
    a reel body attached to a fishing rod;
    a spool rotatably supported by the reel body, configured to wind a fishing line on an outer perimeter thereof; and
    the spool braking device recited in claim 1.

6. A spool braking device, comprising:
    a conductor having a rotational surface, and configured to rotate in conjunction with a spool rotatably supported by a reel body;
    a magnetic unit having at least two magnets arranged on a surface facing the rotational surface of the conductor;
    a support portion movably supporting the magnetic unit between a separated position that is separated from the rotational surface of the conductor and a proximal position that is proximate to the rotational surface of the conductor, the support portion comprising a pivot support shaft pivotably supporting a first end of the magnetic unit; and
a biasing member configured to bias the magnetic unit from the proximal position to the separated position.

* * * * *